Figure 1:
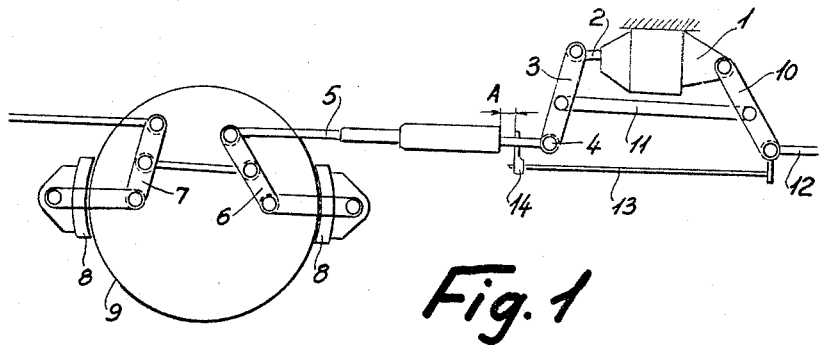

Oct. 11, 1966     K. B. LARSSON     3,277,984
AUTOMATIC SLACK ADJUSTER FOR A VEHICLE BRAKE LINKAGE
Filed Dec. 17, 1964

INVENTOR.
Karl B. Larsson
BY
Watson, Cole, Grindle & Watson
ATTORNEYS

United States Patent Office 3,277,984
Patented Oct. 11, 1966

3,277,984
AUTOMATIC SLACK ADJUSTER FOR A VEHICLE BRAKE LINKAGE
Karl Bertil Larsson, Malmo, Sweden, assignor to Svenska Aktiebolaget Bromsregulator, Malmo, Sweden
Filed Dec. 17, 1964, Ser. No. 419,054
Claims priority, application Great Britain, Dec. 20, 1963, 50,315/63
3 Claims. (Cl. 188—196)

This invention relates to an automatic axially acting two-way slack adjuster for a vehicle brake linkage, the slack adjuster being of the screw and nut type, and more particularly of the type comprising a telescopic brake rod one rod part of which is constructed with a non-self-locking screw thread carrying a leader nut and adjuster nut, a traction sleeve capable of transmitting traction forces above a certain value from the other rod part to the adjuster nut, a barrel surrounding both nuts and the traction sleeve and capable of transmitting traction forces below said certain value from said other rod part to said leader nut, and spring and clutching means for engaging and disengaging the various parts with and from one another in appropriate phases of the braking and releasing stroke depending on the traction force transmitted through the slack adjuster and the engagement and disengagement of the barrel with and from a reference stop so as eventually to cause both of said nuts to be screwed forwards and rearwards on said screw thread in the case of excessive and insufficient slack respectively.

It is an object of the invention to devise a simple and reliable slack adjuster of the type referred to in which the number of mutually movable parts within the barrel has been reduced to a minimum.

A more specific object of the invention is to devise a slack adjuster of the type referred to in which the sliding sleeve which has hitherto usually been provided inside the traction sleeve has been eliminated.

A further object of the invention is to devise a slack adjuster of the type referred to in which adjustment both to increase and to decrease the slack is effected directly in response to the play between the brake shoes and the wheel rims occurring upon application of the brakes, as contrasted to adjustment in response to brake piston stroke, and adjustment to increase insufficient slack is completed in a single braking cycle.

A still further object of the invention is to devise a slack adjuster of the type referred to which in its neutral position is securely locked against unintentional and false adjustment as a consequence of shocks and vibration.

According to one aspect of the invention, an automatic slack adjuster for a vehicle brake linkage comprises an elongated barrel, a front rod part extending into said barrel from the front end thereof, a rear rod part extending into said barrel from the rear end thereof, said rear rod part being constructed with a non-self-locking screw thread, a leader nut and an adjuster nut carried by said screw thread of said rear rod part, said leader nut being engageable by a rear end member of said barrel, a traction sleeve for transmitting braking force from said front rod part to said adjuster nut, a biased barrel spring urging said traction sleeve rearwards relative to said barrel, a biased locking spring urging said traction sleeve forwards relative to said front rod part, said traction sleeve being directly engageable by said front rod part upon compression of said locking spring, a slidably and rotatably mounted spring support clamped between said traction sleeve and said barrel spring, and means for rotatably supporting said spring support relatively to said front rod part upon relative rearward movement of said traction sleeve consequent upon compression of said locking spring.

Further features and objects of the invention will be apparent to those skilled in the art from the following detailed description of one embodiment of the invention with reference to the accompanying drawings.

Before, however, proceeding to this detailed description, a definition will be given of certain concepts to be used in the description and in the appended claims.

From one point of view, the slack adjuster according to the invention may be characterized principally by the manner in which the various elements of which it is composed are arranged to engage with one another, either directly or indirectly, in the axial direction of the slack adjuster. For the purpose of such characterization, in the following description the forward direction is defined as the direction of movement, during application of the brakes, of the brake rod in which the slack adjuster is mounted. The expressions "front" and "rear" refer to the relative location of parts as view in the same direction. An element is said to be forwardly engageable with another element when the force exerted by the former element on the latter element is in the forward direction. The engagement may be either direct or indirect, i.e., through intervening elements. Similarly, an element is said to be rearwardly engageable with another element when the force exerted by the former element on the latter element is in the rearward direction. An element is said to be rotationally engageable with another element, when the engagement is of a character permitting substantially unrestrained mutual rotation of the two elements, e.g. through the intermediary of a ball bearing. Similarly, an element is said to be clutchably engageable with another element when the engagement is of a character offering substantial resistance to mutual rotation of the two elements. Examples of clutchable engagement are frictional engagement and toothed engagement. The line of distinction between rotational and clutchable engagement is whether the engagement is of a character to permit or prevent rotation of the elements referred to below under the influence of axial forces.

Figure 2:
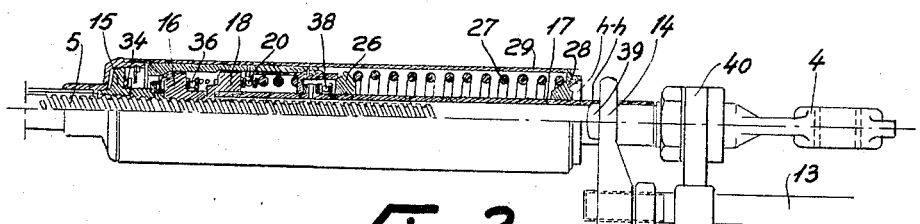
Figure 3:
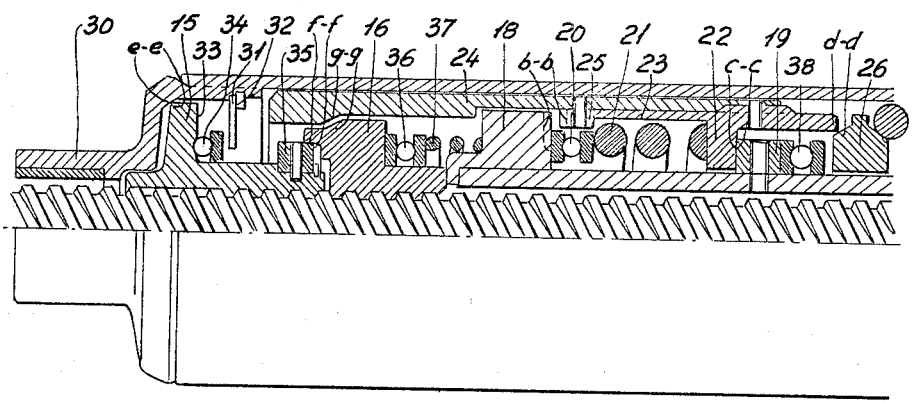

Referring now to the accompanying drawings,

FIG. 1 shows parts of one example of a brake linkage in which a slack adjuster according to the invention may be used, FIG. 2 shows one form of a slack adjuster according to the invention partly in section and on a larger scale, and FIG. 3 shows portions of the adjuster shown in FIG. 2 on a still larger scale.

In FIG. 1 is shown a brake cylinder 1 provided with a piston rod 2 pivotally connected to one end of a live brake lever 3. The other end of the lever 3 is connected to a cross-head 4 forming part of the slack adjuster. The adjuster comprises a rod 5, the extreme left-hand end of which is connected to a lever system comprising a live brake lever 6 and a dead brake lever 7 for applying brake blocks 8 against a wheel 9. A dead brake lever 10 is connected pivotally to a bracket on the brake cylinder 1 and is connected to the live brake lever 3 by a link rod 11. The end of the dead brake lever 10 remote from the cylinder 1 is connected pivotally to a rod 12 which is adapted to be connected to a lever system (not shown) for applying the brakes to another wheel (not shown). In order to make the following explanation more easily understood and as the functioning of the adjuster is not affected, it is assumed that the rod 12 is always kept stationary. A rod 13 carrying a stop 14 is also connected pivotally to the lower end of the dead brake lever 10.

The brake arrangement illustrated in FIG. 1 is conventional except for the construction of the slack adjuster according to the invention, and the adjuster may, of course, be used in any other conventional arrangement which provides the required space.

In FIG. 2, the cross-head 4, rod 5, rod 13 and stop 14 are shown again. The rod 5 is provided at its right-hand end portion with screw-threads having such a pitch as to be non-self-locking with nuts thereon. The screw-threaded part of the rod 5 carries two nuts 15 and 16, of which the left-hand one is the leader nut 15 and the right-hand one is the adjuster nut 16.

The right-hand end portion of the rod 5 extends into a tube 17 rigidly connected to cross-head 4. Thus, the elements 5 and 17 combine to form a telescopic braking rod and may therefore alternatively be referred to as rear rod part and front rod part respectively. The rod 5 and tube 17 are installed in the brake linkage in such a manner that they are prevented from rotating around their common longitudinal axis.

On the left-hand end of the tube 17 and rigidly connected therewith, a flange member 18 extends radially outward. Axially spaced from said flange member 18, a stop ring 19 is also rigidly mounted on the tube 17. Between the member 18 and ring 19 there is clamped a ball-bearing 20, a strong main locking helical compression spring 21 (pre-stressed to about 600 kgp.) and an inwardly-extending flange 22 of a traction sleeve. The traction sleeve comprises two rigidly-interconnected parts 23 and 24 and an inwardly-extending ring 25 rigidly mounted on the sleeve part 24 and forming one part of a dog clutch $b—b$, the other part of which is formed by the flange member 18. The adjacent surfaces of the flange 22 and the stop ring 19 form a friction clutch $c—c$, which is influenced by the force of the spring 21. The right-hand end of the traction sleeve 23, 24 bears against a spring support in the form of a ring 26 which is mounted loose on the tube 17 and is forced towards the left-hand by a helical compression barrel spring 27, the right-hand end of which is in contact with an end plate 28 of an outer barrel 29. Together the loose ring 26 and the right-hand end of the traction sleeve 23, 24 form a friction clutch $d—d$ influenced by the force of the barrel spring 27. The left-hand end of the barrel 29 is provided with an end plate 30, carrying a protecting tube for preventing damage to the screw-threaded part of the rod 5. Adjacent surfaces on the end plate 30 and the leader nut 15 together form a friction clutch $e—e$. The end plate 30 also carries a stop ring 31, extending inwardly and kept stationary in the axial direction on the end plate 30 by a split ring 32. Between the stop ring 31 and a radially-extending surface 33 of the leader nut 15, there is provided a ball-bearing 34 with a small axial free play.

The leader nut 15 is provided with a rigid abutment ring 35 which extends outwardly, and the right-hand circular edge of which forms a friction clutch $f—f$ together with an internal conical surface of the adjuster nut 16.

The adjuster nut 16 is provided with an outer conical surface forming together with a mating internal conical surface of the traction sleeve part 24 a friction clutch $g—g$. The right-hand end of the adjuster nut 16 abuts the flange member 18 rigidly connected to the tube 17. Between radially-extending surfaces of the nut 16 and the flange member 18 are clamped a ball-bearing 36 and a helical compression spring 37.

A ball-bearing 38 is mounted on the tube 17 between the ring 19 and the loose spring support ring 26. The axial length of the ball-bearing 38 is such that a space allows displacement towards the left of the traction sleeve 23, 24 relative to the tube 17 for the dog clutch $b—b$ to become engaged prior to the ball-bearing 38 being abutted by the ring 26. However, the said space is so small that the ring 26 abuts the bearing 38 while there is still axial play in the dog clutch $b—b$ after the traction sleeve 23, 24 is relieved from the force of the barrel spring 27 bearing against the ring 26.

The end plate 28 is provided with an interior conical surface for engagement with a protruding part 39 of the stop 14 to form a friction clutch $h—h$. As will be understood from FIG. 1, an engagement between the stop 14 and the end plate 28, while the barrel 29 is rotating, will tend to cause a swing-out movement of rod 13. Such a movement is, however, prevented by a guide member 40 (shown in FIG. 2 but not in FIG. 1), allowing only axial movements of the rod 13. The guide member 40 is provided with a hole through which the rod 13 is guided.

The illustrated adjuster functions as follows:

As will be seen from FIG. 1, the piston rod 2 will move towards the left upon actuation of the brake cylinder 1. This movement will cause the cross-head 4 to move towards the right, carrying with it the whole slack adjuster, including the rod 5. This will cause the two levers 6 and 7 to turn so that the blocks 8 engage the wheel 9.

The stop member 14 is mounted on the rod 13 at such a distance (A) from the end plate 28 of the adjuster, that in the case of normal slack when the blocks 8 contact the wheel 9 the end plate 28 contacts the abutment 39 on the member 14.

Now it is assumed that the blocks 8 are worn and therefore do not contact the wheel 9 when the abutment 39 on the stop member 14, during application of the brakes, contacts the interior conical surface of end plate 28 (FIG. 2). This is the criterion of excessive slack. A further movement towards the right of the tube 17 during the braking operation will not be possible until the force on cross-head 4 has risen above the force of the barrel spring 27. When the force on the cross-head 4 exceeds the said value, the tube 17 moves further towards the right, while the rod 5 and the nuts 15 and 16 together remain stationary until the tube 17 has been moved the short distance sufficient to engage the clutch $g—g$. From now on, the braking force will be transmitted from the tube 17 through the flange member 18, ball-bearing 20, strong main-locking spring 21, flange 22, traction sleeve 23, 24 and adjuster nut 16, to the rod 5. The rod 5 and the tube 17 will move in unison towards the right, while the barrel 29 will remain stationary. When the barrel 29 and the end plate 30 are stopped by the abutment 39 during the aforesaid movement, the clutch $e—e$ is released and shortly afterwards the stop ring 31 will engage the ball-bearing 34, thus preventing the leader nut 15 from moving further towards the right. The nut 15 will therefore start rotating while the rod 5 is drawn through it towards the right. The clutch $f—f$ will be released and the axial distance between the mating surfaces of the clutch $f—f$ will increase.

When the brake blocks 8 engage the wheel 9 the force in the brake linkage will suddenly increase and will soon reach a value corresponding to the force of the spring 21. At this stage the axial distance between the clutch surfaces $f—f$ will have a value corresponding to the excess slack. A further axial movement of the tube 17 is still possible, owing to elastic deformations in the brake linkage during further increase of the braking force. The spring 21 will therefore be compressed and the clutch $c—c$ will be released. Rotation of the adjuster nut 16 is prevented, however, because the clutches $g—g$, $d—d$ and $h—h$ establish a rigid connection with the stop 14 through the traction sleeve 23, 24, ring 26, barrel spring 27 and end plate 28. Shortly afterwards the dog clutch $b—b$ is engaged and after a further small increase in the braking force the clutch $d—d$ is disengaged. When the clutch $b—b$ has also been closed in the axial direction, the braking force will be transmitted from the tube 17 to the rod 5 through the flange member 18, clutch $b—b$, ring 25, traction sleeve part 24, clutch $g—g$, and adjuster nut 16. A further axial movement of the rod 5 and tube 17 towards the right will cause the nut 15 to rotate further as the barrel 29 will remain stationary owing to its engagement with the abutment 39 on the stop 14.

During the release of the brake which follows, the force transmitted will decrease gradually, and the rod 5 and the tube 17 will move together towards the left. The barrel spring 27 will expand and tend to keep the barrel 29 stationary. The leader nut 15 will move together with the rod 5 for a short distance towards the left until the clutch e—e is engaged. After a further short movement towards the left of the leader nut 15 and the barrel 29, the clutch h—h will be released. The barrel spring 27 may now expand while preventing the barrel 29 from making axial movements during the further movement towards the left of the rod 5 and tube 17. This is possible because the barrel 29, end plates 28 and 30, leader nut 15, barrel spring 27 and loose ring 26 may rotate on the ball-bearing 38 and on the screw-threads of the rod 5. During this movement, the distance between the nuts 15 and 16 will decrease, and when the braking force is equivalent to the force of the spring 21 the clutch d—d is engaged, clutch b—b is disengaged, and clutch c—c is engaged. The axial distance between the clutch surfaces f—f on the nuts 15 and 16 is now again the said value corresponding to the excess slack. A further movement of the barrel 29 towards the left will keep the clutch h—h disengaged, and the force of the barrel spring 27 will be transmitted from the right-hand end of the barrel spring 27 through the end plate 28, barrel 29, end plate 30, clutch e—e, leader nut 15, rod 5, adjuster nut 16, flange member 18, ball-bearing 20, spring 21, flange 22, traction sleeve part 23, and loose ring 26, to the left-hand end of the barrel spring 27. In other words, a compression force corresponding to the force of the barrel spring 27 is to be transmitted between the two nuts 15 and 16 on the screw-threaded part of the rod 5. There exists the said axial distance between the clutch surfaces f—f of the two nuts, but the nut 15 is prevented from rotating as the clutches d—d and c—c are engaged. The nut 16 is prevented from rotation by engagement of the clutch g—g, but as soon as the tension force transmitted has decreased below the force of the spring 27 the clutch g—g will disengage and the nut 16 is now pushed by the spring 37 through the ball-bearing 36 towards the left while rotating. The force of the spring 27 is now moving the rod 5, the nut 15 and the barrel 29 towards the right, until the ring 35 on the nut 15 contacts the adjuster nut 16 to engage the clutch f—f. The result is that the rod 5 has been drawn into the tube 17 through a distance having a value equal to the excess slack, and thus the excess slack has been automatically taken up by the adjuster. After the excess slack has thus been taken up, the rod 5 and tube 17 will move together with the remaining adjuster parts without relative movements towards the left until the brake is completely released and distance A has been established between the clutch surfaces h—h.

In an instance in which the slack has been too small (which may be in the case after replacement of one or more worn brake blocks by new ones) a braking force greater than the force of spring 21 may arise in the brake linkage before the clutch h—h has been engaged during the movement of the adjuster towards the right in FIG. 2.

The braking force is transmitted from the flange member 18 through the ball-bearing 20, spring 21, flange 22, traction sleeve 23, 24, clutch g—g (which was engaged already when the braking force reached the value of the force of barrel spring 27) and adjuster nut 16 to the rod 5. However as soon as the spring 21 is compressed the coupling c—c is disengaged and all the adjuster parts inside barrel 29 (with the exception, of course, of the rod 5 and tube 17) are allowed to rotate on ball-bearing 20. Thus the rod 5 may be drawn out from the tube 17 while the nuts 15 and 16 are rotating and this movement will continue until the clutch h—h is engaged. The adjuster has now increased its length corresponding to the desired increase in the slack. A continued movement of the adjuster towards the right will cause an increase in braking force. The spring 21 will be compressed, the clutch d—d will be opened, the clutch b—b will be engaged, the barrel 29 will be kept stationary, and the nut 15 will start rotating after the disengagement of the clutch e—e and the establishment of contact between the ball-bearing 34 and the stop ring 31 on the end plate 30. Upon release of the brake, the clutch e—e will be engaged and the clutch h—h will be disengaged. Thus the barrel spring 27 will expand and rotate on the ball-bearing 38 together with the barrel 29 and the leader nut 15 until the clutch f—f is engaged. The spring 21 will expand as the force transmitted decreases, and the clutch g—g will be disengaged when the force transmitted is below the force of the barrel spring 27. The last part of the release movement will be performed without relative movements between the rod 5 and the tube 17.

It will be understood that various modifications in the design of slack adjuster described above could be made within the scope of the invention as defined in the appended claims, for example the clutch b—b need not be made as a dog clutch but could be made as a friction clutch in which one member is mounted resiliently so as to allow of a limited axial movement while remaining engaged.

I claim:

1. An automatic slack adjuster for a vehicle brake linkage comprising an elongated barrel, a front rod part extending into said barrel from the front end thereof, a rear rod part extending into said barrel from the rear end thereof, said rear rod part being constructed with a non-self-locking screw thread, a leader nut and an adjuster nut carried by said screw thread of said rear rod part, said leader nut being engageable by a rear end member of said barrel, a traction sleeve for transmitting braking force from said front rod part to said adjuster nut, a biased barrel spring urging said traction sleeve rearwards relative to said barrel, a biased locking spring urging said traction sleeve forwards relative to said front rod part, said traction sleeve being directly engageable by said front rod part upon compression of said locking spring, a slidably and rotatably mounted spring support clamped between said traction sleeve and said barrel spring, and means for rotatably supporting said spring support relatively to said front rod part upon relative rearward movement of said traction sleeve consequent upon compression of said locking spring.

2. An automatic slack adjuster for a vehicle brake linkage, comprising an elongated barrel, a tube extending into said barrel from the front end thereof, a rod extending into said barrel from the rear end thereof and extending into the bore of said tube, said rod being constructed with a non-self-locking screw thread, said tube and said rod being slidable with respect to said barrel, a leader nut and an adjuster nut carried by said screw thread of said rod, said leader nut being clutchably engageable with a rear end member of said barrel, said adjuster nut being clutchably engageable with said leader nut, rotationally engageable stop means for limiting forward movement of said leader nut relative to said barrel, a traction sleeve slidably and rotatably mounted in said barrel, said traction sleeve surrounding said adjuster nut and the rear end of said tube, a spring support loosely surrounding said tube in front of said traction sleeve and rearwardly clutchably engageable with the front end thereof, a barrel spring between said spring support and a front end member of said barrel and clutchably engaged with both, a locking spring stronger than said barrel spring urging said traction sleeve forwards relative to said tube against an abutment thereof, said locking spring being rotationally supported at one end, an adjuster spring urging said adjuster nut rearwards relatively to said tube, said adjuster spring being rotationally supported at one end, said traction sleeve being forwardly clutchably engageable with said adjuster nut upon compression of said barrel spring, said tube being forwardly axially engageable with said traction sleeve upon compression of said locking spring, said spring support being disengageable from said traction sleeve and rearwardly rotationally engageable with an abutment of said tube upon compression of said locking spring, said barrel being forwardly clutchably engageable upon a predetermined travel thereof from its neutral position with a reference stop.

3. An automatic slack adjuster for a vehicle brake linkage comprising an elongated barrel, a tube extending into said barrel from the front end thereof, a rod extending into said barrel from the rear end thereof and extending into the bore of said tube, said rod being constructed with a non-self-locking screw thread, said tube and said rod being slidable with respect to said barrel, a leader nut and an adjuster nut carried by said screw thread of said rod, said leader nut being clutchably engageable with a rear end member of said barrel, said adjuster nut being clutchably engageable with said leader nut, rotationally engageable stop means for limiting forward movement of said leader nut relative to said barrel, a traction sleeve slidably and rotatably mounted in said barrel, said traction sleeve surrounding said adjuster nut and the rear end of said tube, a stop ring secured to said tube, said stop ring being forwardly engageable by an inwardly extending flange of said traction sleeve, a locking spring urging said traction sleeve forwards relative to said tube to engage said flange with said tsop ring, a ball bearing around said tube in front of said stop ring, a spring support loosely surrounding said tube in front of said ball bearing, said traction sleeve extending in front of said stop ring and said ball bearing to engage said spring support, a barrel spring weaker than said locking spring between said spring support and a front end member of said barrel and clutchably engaged with both, said traction sleeve being forwardly clutchably engageable with said adjuster nut upon compression of said barrel spring, dog clutch means on said tube and said traction sleeve engageable upon compression of said locking spring, said spring support being disengageable from said traction sleeve and engageable with said ball bearing upon compression of said locking spring, said barrel being forwardly clutchably engageable upon a predetermined travel thereof from its neutral position with a reference stop.

References Cited by the Examiner

UNITED STATES PATENTS

| | | | |
|---|---|---|---|
| 2,837,179 | 6/1958 | Jeppsson | 188—196 |
| 3,194,358 | 7/1965 | Brandt | 188—196 |

DUANE A. REGER, *Primary Examiner.*